(12) United States Patent
Inglin et al.

(10) Patent No.: US 7,279,645 B1
(45) Date of Patent: Oct. 9, 2007

(54) MULTIPLE CONVEYOR AND SCALE WEIGHING APPARATUS

(75) Inventors: Eric A. Inglin, Ithaca, NY (US); Gary E. Donaldson, Ithaca, NY (US)

(73) Assignee: Mettler-Toledo, Inc., Columbus, OH (US)

( * ) Notice: Subject to any disclaimer, the term of this patent is extended or adjusted under 35 U.S.C. 154(b) by 0 days.

(21) Appl. No.: 11/382,997

(22) Filed: May 12, 2006

(51) Int. Cl.
*G01G 19/00* (2006.01)
(52) U.S. Cl. .................................... 177/145; 177/199
(58) Field of Classification Search ............... 177/119, 177/145, 185, 199–200
See application file for complete search history.

(56) References Cited

U.S. PATENT DOCUMENTS

| | | | |
|---|---|---|---|
| 4,177,868 A * | 12/1979 | Sanders et al. | 177/211 |
| 4,794,996 A | 1/1989 | Wallace et al. | |
| 4,804,052 A * | 2/1989 | Griffen | 177/25.14 |
| 4,853,881 A | 8/1989 | Yamada | |
| 4,992,775 A * | 2/1991 | Castle et al. | 340/525 |
| 5,109,936 A | 5/1992 | Ruppel | |
| 5,174,400 A | 12/1992 | Hasegawa et al. | |
| 5,190,115 A | 3/1993 | Dolan et al. | |
| 5,230,391 A | 7/1993 | Murata et al. | |
| 5,300,736 A * | 4/1994 | Ehrhardt | 177/145 |
| 5,304,745 A * | 4/1994 | Rusk et al. | 177/145 |
| 5,308,930 A | 5/1994 | Tokutu et al. | |
| 5,373,363 A | 12/1994 | Kobayashi | |
| 5,596,179 A | 1/1997 | Sakaeda | |
| 5,635,679 A * | 6/1997 | Kohashi et al. | 177/145 |
| 5,684,275 A | 11/1997 | Tolson | |
| 5,789,713 A * | 8/1998 | Wakasa et al. | 177/25.13 |
| 5,797,481 A | 8/1998 | Uber et al. | |
| 5,814,772 A | 9/1998 | Nishimura et al. | |
| 5,990,422 A | 11/1999 | Komori et al. | |
| 6,013,879 A | 1/2000 | Nakamura et al. | |
| 6,433,288 B1 | 8/2002 | Olafsson | |
| 6,552,278 B2 | 4/2003 | Johnson | |
| 6,639,156 B2 | 10/2003 | Luke et al. | |
| 6,861,592 B2 | 3/2005 | Gerstenberg et al. | |
| 6,875,932 B2 * | 4/2005 | Tuft | 177/25.13 |

* cited by examiner

*Primary Examiner*—Randy W. Gibson
(74) *Attorney, Agent, or Firm*—Standley Law Group LLP

(57) ABSTRACT

The weighing apparatus may have a plurality of conveyor belts, a plurality of physical scales, a plurality of logical scales and a master processor. The master processor may receive weight results from the plurality of physical and logical scales and may determine a net weight of said package. The weighing apparatus may also include a plurality of slave processors.

19 Claims, 6 Drawing Sheets

MULTIPLE CONVEYOR AND SCALE WEIGHING APPARATUS

BACKGROUND AND SUMMARY OF THE INVENTION

The present invention relates generally to weighing apparatus for weighing multiple packages of various shapes and sizes. More specifically, the present invention is directed to a weighing apparatus having multiple conveyors and multiple scales in a master/slave relationship for weighing a plurality of packages of various shapes and sizes.

Weighing apparatus may be used in a variety of processes. Weighing apparatus may be used as part of a conveyor system to weigh items as they travel along a conveyor. One such system, known generally as a checkweigher, may include three conveyors arranged one after the other each with a separate purpose. The first conveyor may be an infeed conveyor, the second a weighing conveyor and the third a discharge conveyor. The infeed conveyor may accelerate items to give proper spacing so that the weighing conveyor weighs one item at a time. This type of a system may not have the capacity or throughput to weigh many different sized items in a highly efficient manner.

Other weighing apparatus, such as that described in U.S. Pat. No. 5,990,422, may use multiple weighing conveyor belts. Such apparatus may use a photo eye at the entrance of each belt to detect when a package arrives on that belt. The apparatus may also use the distance between the photo eyes as a reference length to assist in determining the length of the package and to reduce error. This type of weighing apparatus may generally require complex circuitry and computation to determine the length while not eliminating error due to variations in the conveyor motor drive systems.

Exemplary embodiments of the present invention may overcome or solve these problems. Exemplary embodiments of the present invention may be directed to a weighing apparatus having a plurality of conveyor belts, a plurality of physical scales associated with the plurality of conveyor belts and a master processor electronically connected to the plurality of physical scales. The master processor may form a plurality of logical scales by combining two or more physical scales. The weighing apparatus may also include a plurality of slave processors. The slave processors may detect multiple weight samples from the physical and logical scales and may pass those samples through a filter to remove high frequency noise. The slave processors may send the results to the master processor which may compute a net weight based on the results provided by the slave processors.

The weighing apparatus may also include a single photo eye which may detect when a package arrives at the first conveyor belt. Exemplary embodiments of the present invention may not be concerned with detecting a reference length based on the distance between more than one photo eye. Exemplary embodiments of the present invention preferably use only a single photo eye so that detecting a reference length is not even possible. Using the speed of the conveyor belts and the duration of time the package is in front of the photo eye, a length of the package may be calculated. The master processor may then use the calculated length to track the package as it passes from conveyor belt to conveyor belt rather than using a second or third photo eye.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF THE EXEMPLARY EMBODIMENT(S)

Figure 1:
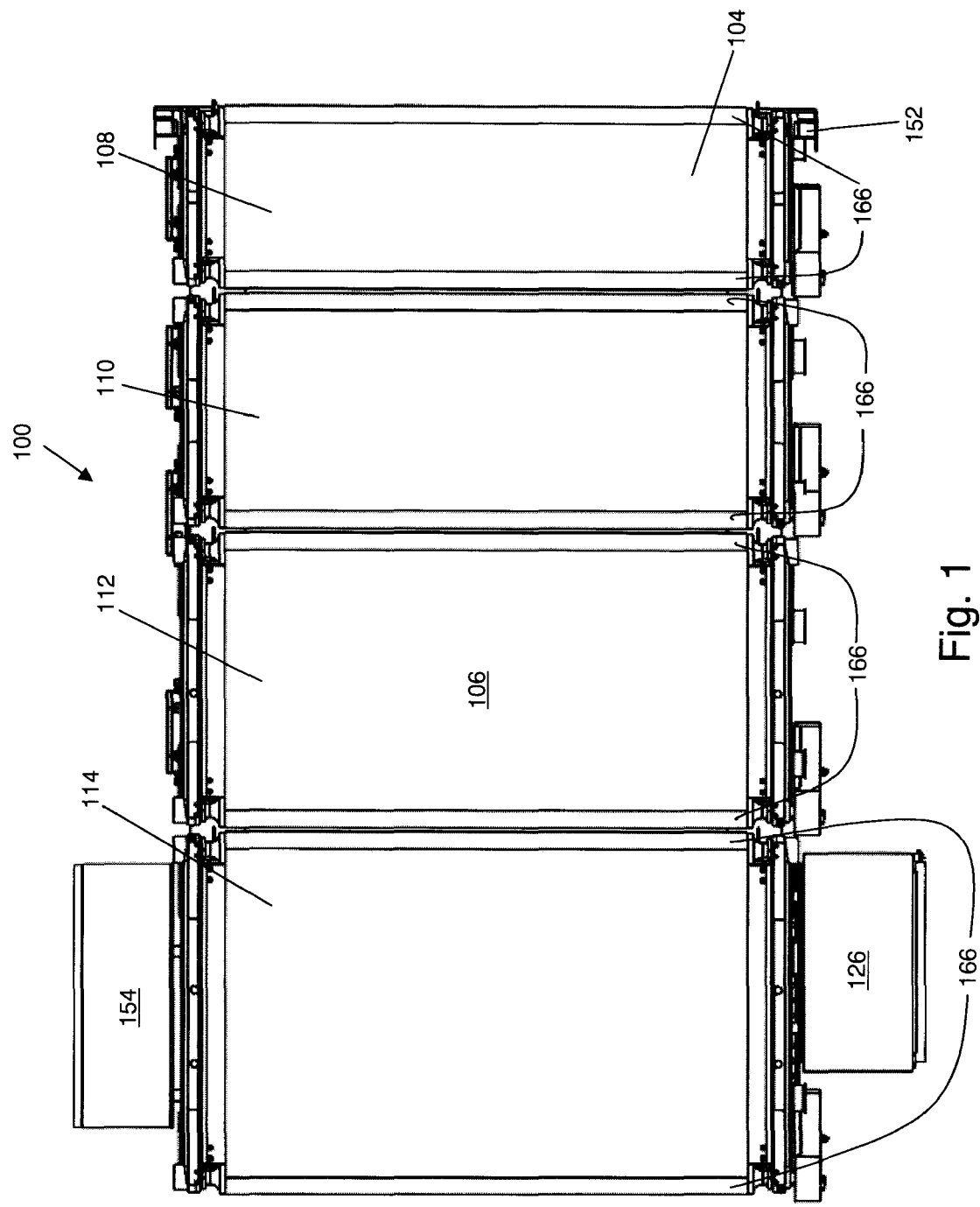
FIG. 1 illustrates a top plan view of one embodiment of the present invention.
Figure 2:
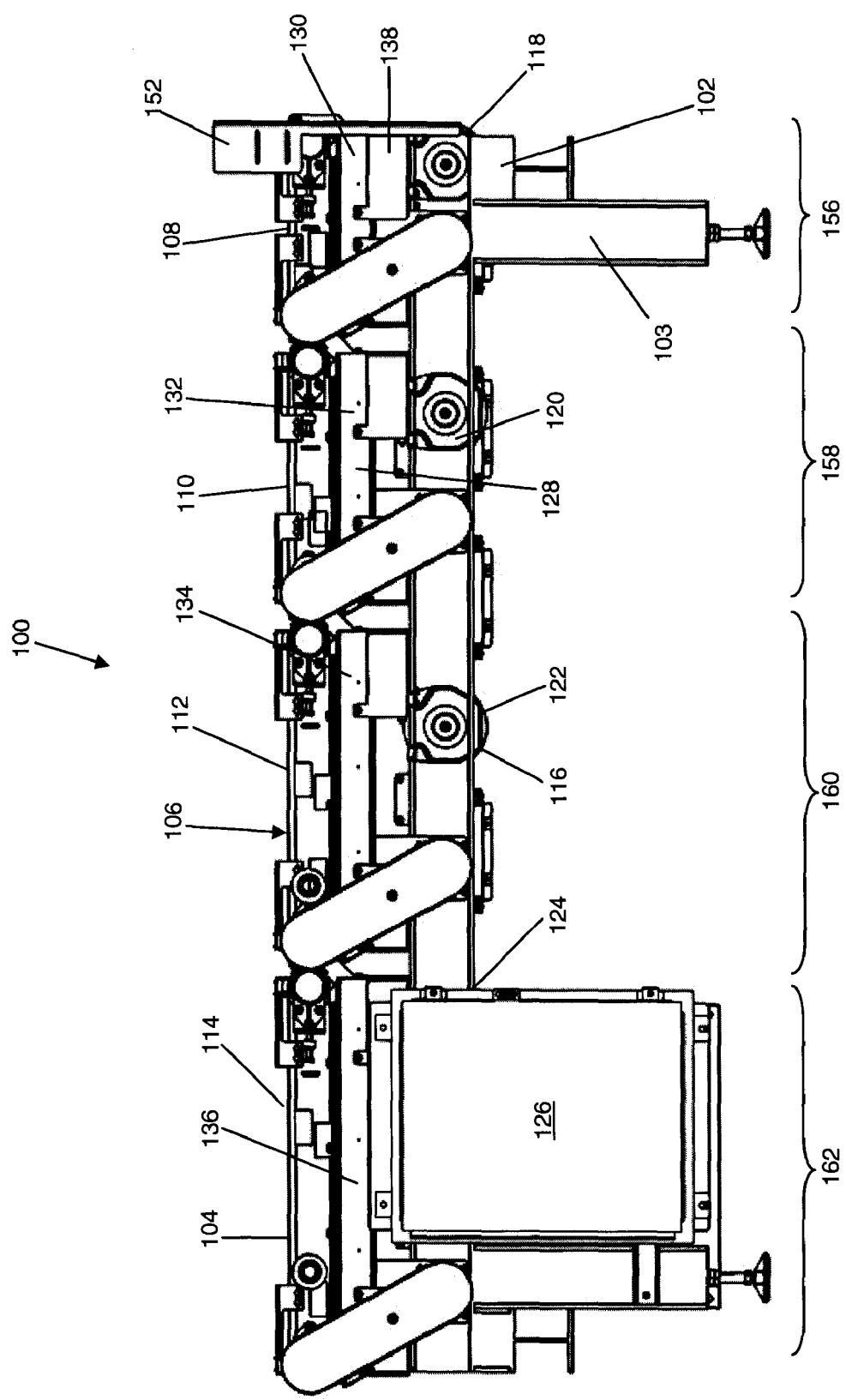
FIG. 2 illustrates a side elevation view of one embodiment of the present invention.
Figure 3:
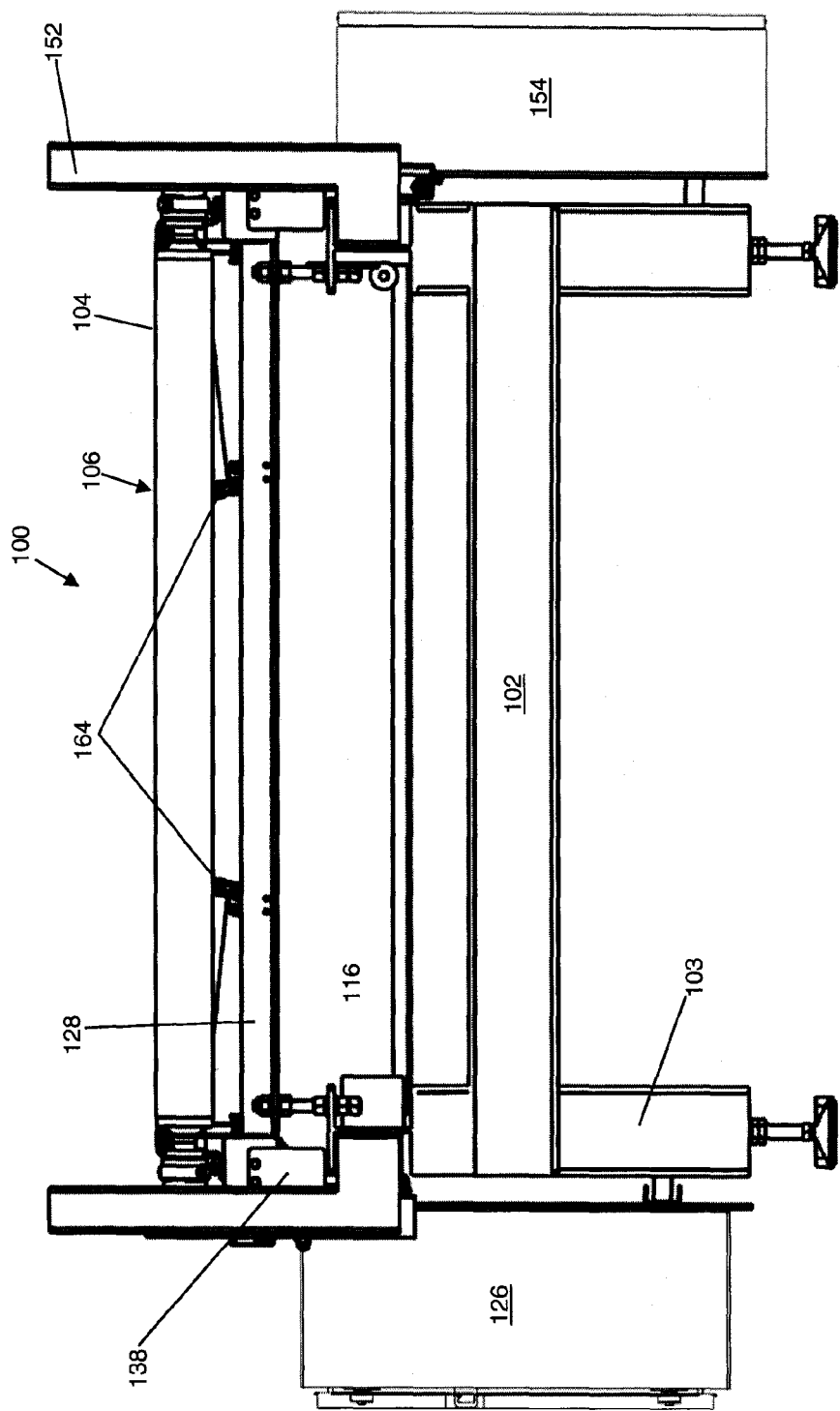
FIG. 3 illustrates a front elevation view of one embodiment of the present invention.

FIGS. 1-3 illustrate one exemplary embodiment of a weighing apparatus 100. The weighing apparatus 100 may have a frame 102. The frame 102 may be any structure of sufficient strength to support the weight of the components of the weighing apparatus 100 and multiple packages that may be weighed by the weighing apparatus 100. The frame 102 may be made as a single integral component or may be made of multiple components connected together. The multiple components may be permanently connected or may be removably connected. The frame 102 may include a plurality of legs 103.

The weighing apparatus 100 may have a plurality of endless conveyor belts 104. The endless conveyor belts 104 may be any length and may be arranged end-to-end. Each conveyor belt 104 may be a different length, for example, one conveyor belt 104 may be slightly longer or shorter than an adjacent belt. The length of the conveyor belt 104 may determine the amount of available surface 106 on which to support a package. The longer the conveyor belt 104 the longer the surface 106 on which to support a package. In one embodiment, each downstream conveyor belt may be longer than the upstream conveyor belt. In another embodiment, each upstream conveyor belt may be longer than the downstream conveyor belt. Any number of conveyor belts 104 may be used. In one embodiment, three conveyor belts 104 may be used. In another embodiment, four conveyor belts 104 may be used, such as, first, second, third and fourth conveyor belts, 108, 110, 112 and 114 respectfully.

A motor 116 may be associated with each conveyor belt 104. The motor 116 may be connected to the conveyor belt 104 through one or more conveyor pulleys 166. The motor 116 may rotate one of the conveyor pulleys 166 which may cause the conveyor belt 104 to rotate around the conveyor pulleys 166. Any number of motors 116 may be used for each conveyor belt 104. In one embodiment, one motor 116 is used for each conveyor belt 104. In one embodiment where four conveyor belts may be used, first, second, third and fourth motors, 118, 120, 122 and 124 respectively, may be used. A motor controller 126 may control the motors 116. The motor controller 126 may control and detect the rotation speed of the conveyor belts 104 individually and/or as a group. A plurality of tracking rollers 164 may be associated with each conveyor belt 104. The tracking rollers 164 may be placed at a slight angle in the vertical plane and may prevent the belt from running to either one side or the other.

The weighing apparatus 100 may include a plurality of physical scales 128. A physical scale 128 may be associated with each conveyor belt 104. Any number of physical scales 128 may be used. In one embodiment where four conveyor belts 104 may be used, first, second, third and fourth physical scales, 130, 132, 134 and 136 respectively, may be used. Each physical scale 128 may have a plurality of load cells 138. Any load cell known in the art and any number of load cells 138 may be used. In one embodiment, four load cells 138 may be used per physical scale 128.

The weighing apparatus control software may be constructed in a master-slave configuration. Each physical scale 128 may be connected electronically to a slave processor 140 which may receive weight signals from a physical scale 128 as directed by a master processor 142. Any processor known in the art may be used. In one embodiment, the 80/186 processor available from Intel Corporation of Santa Clara, Calif. may be used. Any number of slave processors may be used. In one embodiment, where four conveyor belts are used, four slave processors, first, second, third and fourth, 144, 146, 148 and 150 respectively, may be used. The master processor 142 may be connected to the slave processors 140 and may form a plurality of logical scales. For example, where four physical scales, A, B, C and D, are used, there are six logical scales composed of the following physical combinations: A-B, B-C, C-D, A-B-C, B-C-D and A-B-C-D. This allows ten physical and logical scales of varying sizes, enabling the system to accommodate a wide variety of package lengths. For a three physical scale system using scales A, B and C, there are 3 logical scales composed of the following physical combinations: A-B; B-C; and A-B-C. This allows 6 physical and logical scales of varying sizes. In a five scale system, using scales A, B, C, D and E, there are 10 logical scales composed of the following physical combinations: A-B, B-C, C-D, D-E, A-B-C, B-C-D, C-D-E, A-B-C-D, B-C-D-E and A-B-C-D-E. This allows 15 physical and logical scales of varying sizes. This sequence may be continued for any number of scales. Weight samples may be collected for each of the physical scales 128 whenever a package is small enough to fit on that physical scale 128 or on a logical scale of which that physical scale is a part of and it is the only package on that scale.

All slave processors 140 may be included in more than one logical scale. For example, in the case of a four physical scale system, scale A may act alone and may also be part of the combinations A-B, A-B-C, and A-B-C-D. Each slave processor 140 may have the capability of simultaneously collecting weight signals for all of its physical scales 128 and logical scales. When a slave processor 140 receives a command to start weighing for a combination to which it belongs, it may detect weight signals until it is commanded to stop. In one embodiment, a weight signal may be detected every millisecond. At the end of the collection period, the slave processor 140 may pass the signals through any number of filtering algorithms and may report the weight results back to the master processor 142. The filtering algorithm may be a hardware filter, a software filter or a combination of a hardware filter and software filter. The filters may process the analog and/or digital signals received from the load cells and filter out high frequency noise. In one embodiment where four conveyors are used, four slave processors first, second, third and fourth slave processors, 144, 146, 148 and 150 respectively, may be used.

The master processor 142 may perform a variety of functions. The master processor 142 may track packages through the system; may issue commands to the slave processors 140 to start and stop the weighing process (based on the package tracking); and may receive the weight results from the slave processors 140 to compute a net weight. Package tracking may be event-based and may be accomplished via two connections to the system hardware, one to the photo eye 152 located at the front of the system and one to the motor controller 126. Based on these two signals, the package tracking software may measure the length of each package as it enters the system and may track each package through the system as it enters and leaves the various physical scales 128 and logical scales. The length may be determined only once per package. Once the master processor 142 has determined the length of the package, it may compare the package length to the predetermined lengths of the conveyor belts 104 and may determine when the package is alone on a physical or logical scale. When a package is alone on a scale that is large enough to accommodate it, the master processor 142 may issue a command to start weighing. A stop weighing command may be issued when the leading edge of the package leaves the scale or another package enters the scale. The master processor 142 may also issue rezero commands when the scales are empty. The master processor 142 may receive the weight results from each slave processor and may compute the net package weight using an algorithm that accounts for the number of weight results that were accumulated from each individual physical and logical scale. The master processor 142 and slave processors 140 may be part of a scale controller 154. By using multiple weight results a more accurate weight may be calculated.

Figure 4:
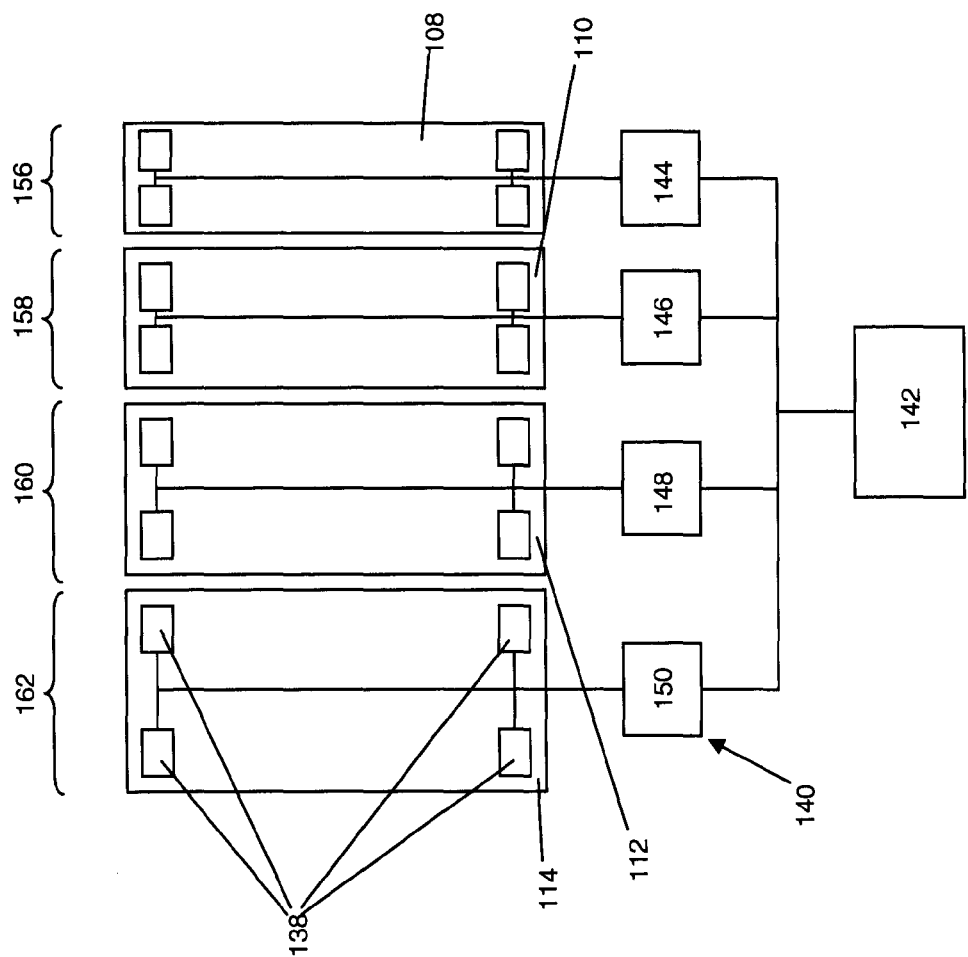
FIG. 4 illustrates a schematic diagram of one embodiment of the present invention.
Figure 5:
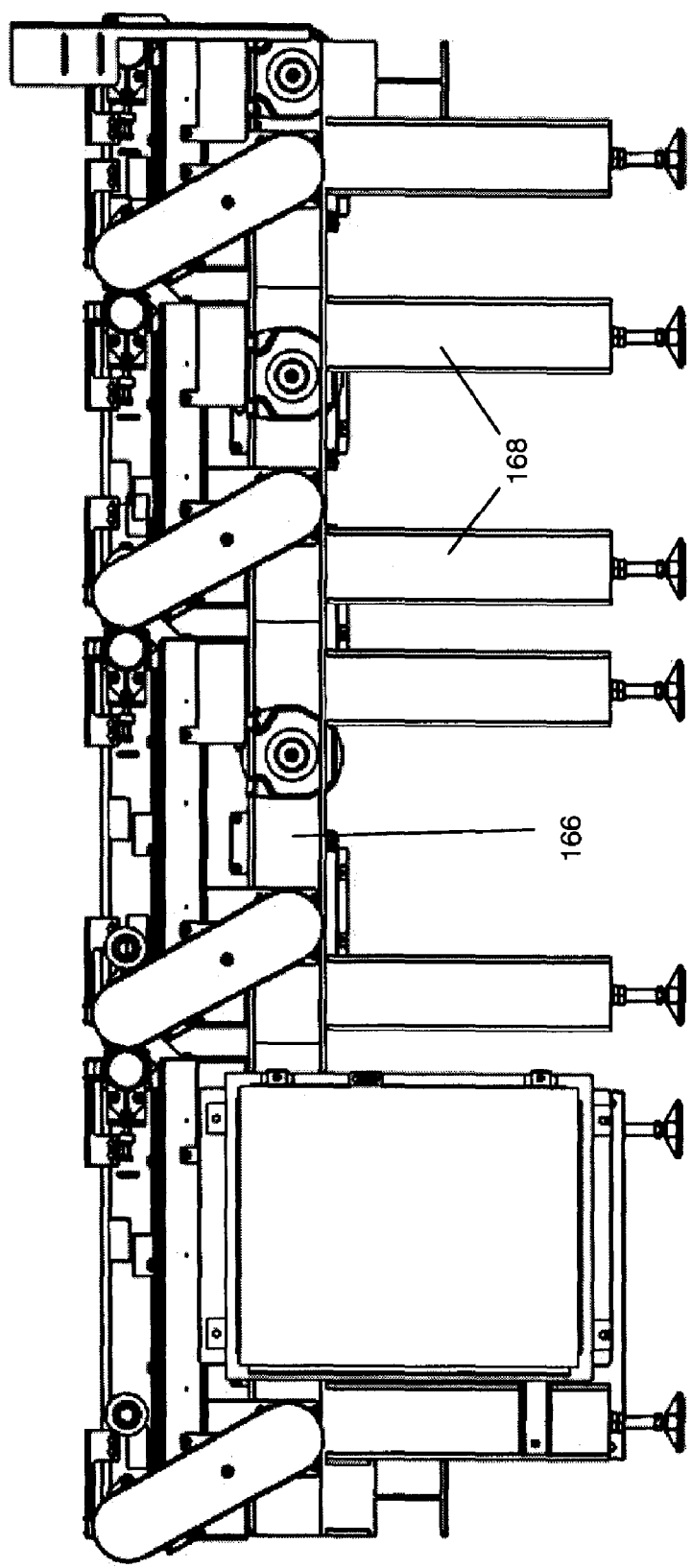
FIG. 5 illustrates a side elevation view of another embodiment of the present invention.

As shown in FIGS. 3 and 4, the conveyor belts 104, motors 116, physical scales 128 and slave processors 140 may a form a plurality of weigh modules. For example, first conveyor belt 108, first motor 118, first physical scale 130 and first slave processor 144 form a first weigh module 156. A four weigh module system may form first, second, third and fourth weigh modules, 156, 158, 160 and 162 respectively. Any number of weigh modules may be used. As shown in FIG. 5, one exemplary embodiment of each weigh module may include a frame 166. The frame 166 may include a plurality of legs 168 for supporting the weigh module. Each frame 166 may be connected to each adjacent frame. Connecting each frame to each adjacent frame may allow the weighing apparatus 100 easier to transport. Once the weighing apparatus 100 is installed in the appropriate location, each frame 166 may be separated from each adjacent frame 166. By separating each frame 166 from each adjacent frame 166, any rocking or vibration occurring at one scale may be reduced so that it may not be transmitted to the other scales.

Figure 6:
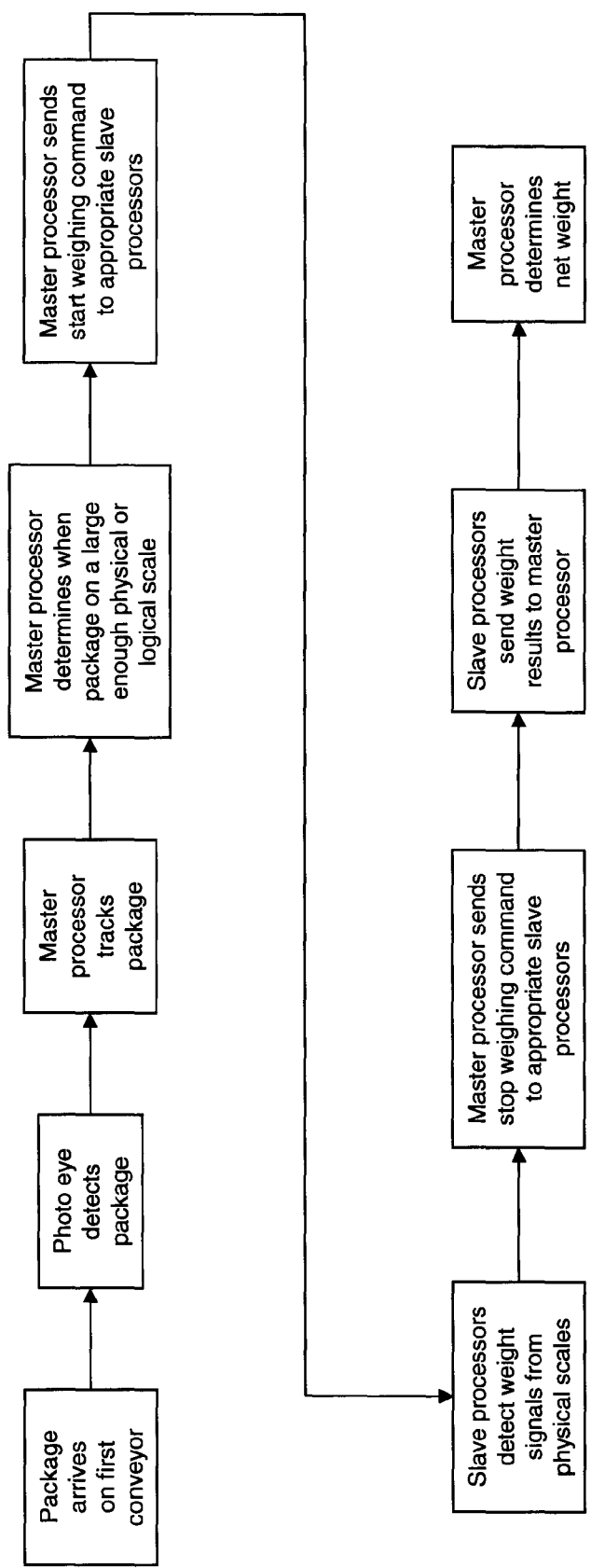
FIG. 6 illustrates a flow diagram of a method of one embodiment of the present invention.

FIG. 6 shows one method of using an exemplary embodiment of the present invention. A package may arrive at the first conveyor belt 108. The package may be placed on the first conveyor belt 108 manually or automatically from another conveyor belt or similar machine upstream of the weighing apparatus 100 in an in-line continuous process. Next, the photo eye 152 may detect the package and may transmit a signal to the master processor 142 that a package has arrived. Based on inputs from the photo eye 152 and the motor controller 126, master processor 142 may determine the length of the package. The master processor 142 may then track the package as it progresses downstream along the weighing apparatus 100. Next, the master processor 142 may determine when the package is on a physical or logical scale large enough to accommodate it. Once a package is on an appropriate scale, the master processor 142 may send a start weighing command to the corresponding slave processors 140. Next, the slave processors 140 may detect weight signals from the load cells 138 of the physical scales 128. Next, the master processor 142 may send a stop weighing command to the corresponding slave processors 140 and the package may continue on downstream of the weighing apparatus 100. The slave processors 140 may filter the weight signals and then send the weight results to the master processor 142. Based on the weight results sent by the slave processors 140, the master processor 142 may determine the net weight of the package. Each package may be weighed multiple times as it progresses along the conveyor belts 104. For example, multiple weight signals are detected and filtered by the slave processors 140. The master processor 142 may then determine a net weight for that physical or logical scale. The package may then progress to another scale that is large enough to accommodate it and the process may be repeated. The entire weighing process may take less than a few seconds to complete. This may allow a large number of packages to be weighed accurately in a short period of time.

While certain embodiments of the present invention are described in detail above, the scope of the invention is not to be considered limited by such disclosure, and modifications are possible without departing from the spirit of the invention as evidenced by the following claims:

What is claimed is:

1. A multiple scale weighing apparatus comprising:
    a plurality of conveyor belts;
    a plurality of physical scales associated with said plurality of conveyor belts, each physical scale having at least one load cell;
    a master processor electronically connected to said plurality of physical scales;
    a plurality of slave processors electronically connected to said plurality of physical scales and said master processor, said plurality of slave processors adapted to receive weight signals from said plurality of physical scales; and
    a plurality of logical scales formed by said master processor by combining two or more slave processors.

2. The weighing apparatus of claim 1 further comprising:
    a filter electronically connected to at least one of said plurality of slave processors.

3. The weighing apparatus of claim 1 further comprising:
    a single photo eye electronically connected to said master processor.

4. The weighing apparatus of claim 1 further comprising:
    a motor connected to at least one of said plurality of conveyor belts and adapted to rotate said at least one conveyor belt.

5. The weighing apparatus of claim 4 further comprising:
    a motor controller connected to said motor and adapted to control said motor.

6. The weighing apparatus of claim 1 further comprising:
    a frame adapted to support said conveyor belts, physical scales and master processor.

7. The weighing apparatus of claim 1 wherein said weighing apparatus has four conveyor belts.

8. The weighing apparatus of claim 7 wherein said four conveyor belts are arranged end-to-end from the shortest belt to the longest belt.

9. The weighing apparatus of claim 1 further comprising:
    a frame which may be disconnected from an adjacent frame to reduce vibration which may be transmitted between adjacent conveyor belts.

10. A weighing apparatus comprising:
    a plurality of adjacent weigh modules, each of said plurality of weigh modules having:
        an independent support frame,
        a belt,
        a motor,
        a physical scale, and
        a slave processor,
    a master processor electronically connected to said slave processors of said plurality of weigh modules; and
    a plurality of logical scales formed by said master processor by combining two or more weigh modules.

11. The weighing apparatus of claim 10 wherein adjacent weigh support frames are unconnected to reduce vibration that may be transmitted between adjacent weigh modules.

12. The weighing apparatus of claim 10 wherein said at least one slave processor comprises a filter adapted to filter high frequency noise from a plurality of weight samples.

13. The weighing apparatus of claim 10 further comprising:
    a single photo eye electronically connected to said master processor.

14. The weighing apparatus of claim 10 further comprising:
    a motor controller connected to said motor and adapted to control said motor.

15. A method of weighing packages of various sizes comprising:
    placing a package to be weighed on a plurality of adjacent weigh modules;
    determining a first plurality of weight samples of said package at one of said plurality of weigh modules;
    determining a second plurality of weight samples of said package at a second of said plurality of weigh modules;
    passing said first plurality of weight samples and said second plurality of weight samples through a filter; and
    calculating a total weight of said package from at least said filtered first and second plurality of weight samples of said package;
    wherein said plurality of weigh modules each comprise an independent support frame, a conveyor belt, a motor, a physical scale and a slave processor, and wherein said calculating is performed by a master processor in electronic communication with said slave processors.

16. The method of weighing packages of claim 15 further comprising:
    filtering high frequency noise from said weight samples.

17. The method of weighing packages of claim 15 further comprising:
    detecting said package to be weighed.

18. The method of weighing packages of claim 15 further comprising:
    determining the length of said package.

19. A weighing apparatus comprising:
    a plurality of weigh modules, each of said plurality of weigh modules having a frame;

a motor connected to at least one of said plurality of weigh modules;

a motor controller connected to said motor and adapted to control said motor;

a master processor electronically connected to said plurality of weigh modules; and a plurality of logical scales formed by said master processor by combining two or more weigh modules;

wherein each frame which may be disconnected from an adjacent frame to reduce vibration which may be transmitted between adjacent weigh modules.

* * * * *